United States Patent [19]

Schroepfer et al.

[11] Patent Number: 5,111,839

[45] Date of Patent: May 12, 1992

[54] AIRPLANE TOILET DRAIN VALVE ASSEMBLY

[75] Inventors: David J. Schroepfer, Laguna Hills; Tadeusz Podkanski, Mission Viejo, both of Calif.

[73] Assignee: Rogerson Aircraft Corporation, Irvine, Calif.

[21] Appl. No.: 690,600

[22] Filed: Apr. 24, 1991

[51] Int. Cl.⁵ .......................... F16K 1/18; F16K 25/00
[52] U.S. Cl. ..................................... 137/242; 137/240; 137/312; 251/159; 251/174; 251/298
[58] Field of Search ......................... 137/240, 242, 312; 251/159, 160, 162, 174, 229, 298, 301, 304, 314, 315

[56] References Cited

U.S. PATENT DOCUMENTS

| | | | |
|---|---|---|---|
| 2,316,933 | 4/1943 | Chaplin | 251/159 |
| 3,485,475 | 12/1969 | Moore et al. | 251/159 |
| 3,528,448 | 9/1970 | Urban | 137/242 |
| 3,557,822 | 1/1971 | Chronister | 251/159 |
| 3,799,188 | 3/1974 | Chronister | 251/301 |
| 4,137,935 | 2/1979 | Snowdon | 137/242 |
| 4,262,688 | 4/1981 | Bialkowski | 137/242 |
| 4,338,960 | 7/1982 | Ashdown | 251/159 |
| 4,354,665 | 10/1982 | Ulveling et al. | 251/298 |
| 4,383,546 | 5/1983 | Walters, Jr. | 137/240 |
| 4,962,911 | 10/1990 | Soderberg | 251/159 |

Primary Examiner—George L. Walton
Attorney, Agent, or Firm—Fulwider, Patton, Lee & Utecht

[57] ABSTRACT

An improved airplane toilet drain valve assembly comprising a rotatable valve mounted within a housing and a moveable sealing member which is arranged in contact with the valve surface when the valve is in a closed position and which during operation of the valve is moved away from the valve surface thereby avoid wear or damage due to friction between the seal and rotating valve. The invention further comprises a scraper member mounted within the valve housing which prevents solid waste materials from coming into contact with the seals.

20 Claims, 10 Drawing Sheets

AIRPLANE TOILET DRAIN VALVE ASSEMBLY

FIELD OF INVENTION

This invention relates to the field of valve assemblies. More particularly, this invention relates to the field of airplane waste system drainage valves.

BACKGROUND OF INVENTION

It has long been known in the art to provide holding tanks for toilet and other waste systems utilized in common carriers, such as airplanes, trains, busses and the like. Generally these systems all include a holding tank which contains both the solid and liquid waste materials. In each of these systems, it is necessary to provide a means by which the waste holding tank may be emptied or drained.

In the past, in particular in connection with aircraft toilet systems, the waste drain valve assemblies employed almost exclusively utilized a ball valve equipped with one or more elastomer seals. The ball valves were typically spherical units having a cylindrical passageway running through the unit. In the open position the cylindrical passageway was aligned with the waste holding tank and the exterior outlet drain. In the closed position the ball valve was rotated 90° such that the valve body blocked both the holding tank and the outlet drain. In these prior devices the seals were maintained in constant contact with the body of the ball valve itself. When the ball valve was rotated from an open to a closed position and/or vice versa, the seals remained in contact with and scraped over the surface of the ball valve resulting in a flexing of the elastomer seals through friction with the surface of the ball valve which led to premature deterioration of the seals and ultimately leakage through the seal. Additionally, waste material which adhered to the surface of the ball valve body was forced into contact with the seals whereby the seals were used as a scraper to clean the waste matter off of the ball valve. This also led to damaged seals or enhanced and expedited the deterioration of the seal with the ultimate problem of leakage around the ball valve occuring. In order to prevent or minimize the risk of leakage, the prior designs frequently utilized multiple seals with one seal being located at the top or waste tank side of the ball valve and the second seal being located at the bottom or drain outlet side of the ball valve. However, experience has shown that these prior valves prematurely developed leaks due to the constant contact and friction between the ball valve and the seals which resulted in the seals being damaged through normal use with the resulting leakage occurring.

In addition to being unsanitary, the leakage which occured in the prior designs resulted in the undesirable formation of ice on the exterior of the airplane during flight which created an unacceptable hazard for people and objects on the ground. In the event of a faulty or leaking valve assembly, it is not uncommon for large blocks of ice, weighing several pounds, to be formed from the leaking waste water which on occasion break free from the airplane creating a hazard to flight safety and those on the ground.

A need therefore exists for a valve mechanism that may be utilized in toilet or other waste systems which satisfactorily prevents leakage from the system.

A need also exists for a waste valve assembly for airplane toilet systems which avoids premature wear or damage to the seals. It is an object of the present invention to provide a low cost, light weight, efficient valve assembly for use in airline toilet systems which properly seals the drain tank and prevents premature damage or wear to the seals.

SUMMARY OF INVENTION

The subject invention is directed towards a rotatable, translational ball-type valve assembly for use in connection with aircraft waste systems. An essentially cylindrical shaped valve body housing connects the bottom or drain opening of the waste system holding tank with the aircraft's exterior drain connection. The valve is operated by a valve handle rotatably mounted external of the valve housing. When the valve handle is rotated from the closed to the open position the first segment of or initial rotation of the valve handle operates a lifting mechanism which lifts the valve seals away from engagement with the valve surface and continued rotation of the handle causes the valve to rotate 90° to the open position. The valve utilizes a spherical segment rotatable through a 90° arc between the open and closed positions. When the valve is in the closed position, the spherical segment is in sealing engagement with a pair of elastomer seals or O-rings mounted in the upper interior section of the valve body housing. In this closed position fluid and solid waste are prevented from passing through the valve housing.

The valve assembly also includes a scraper sleeve which maintains contact with the spherical segment in both the open and closed position. The scraper sleeve prevents solid waste materials from adhering to the valve body and from coming into contact with the seals and further acts to continue scraping the solid waste materials off of the spherical segment when the valve is rotated.

DETAILED DESCRIPTION

Figure 1:
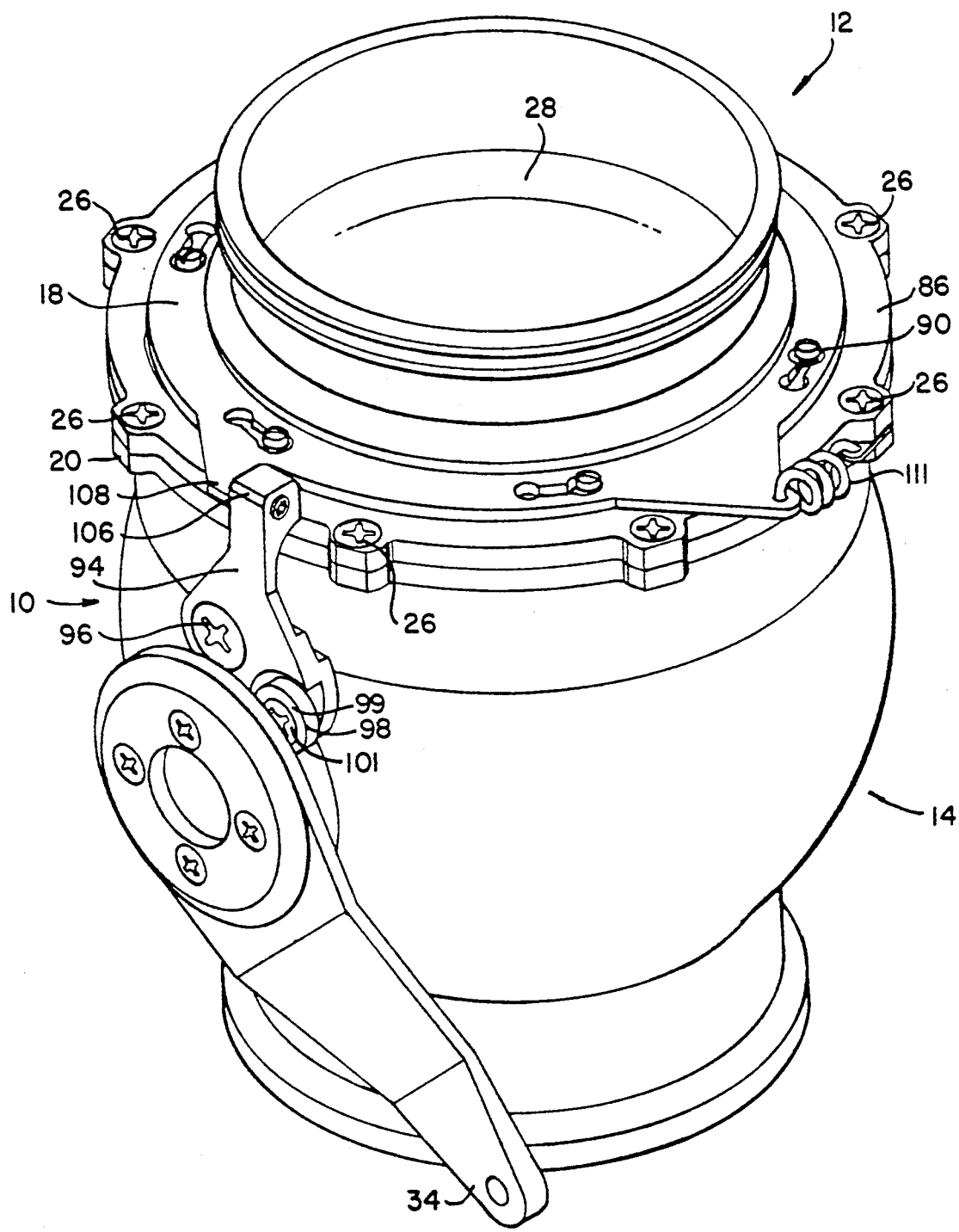
FIG. 1 is a perspective view of a valve housing incorporating a first embodiment of the subject invention.
Figure 2:
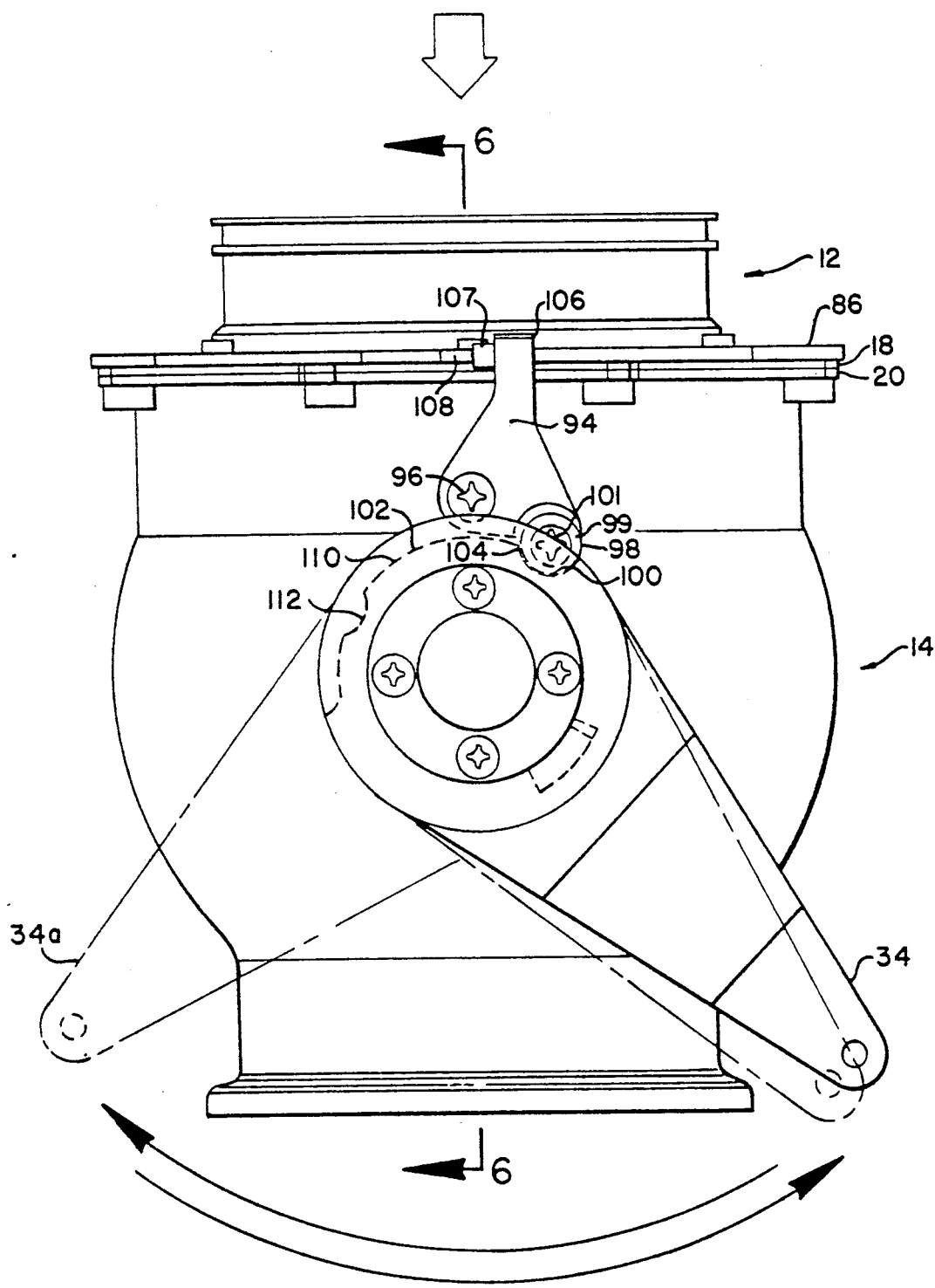
FIG. 2 is a side view of the valve body housing and activation handle of the subject invention.

The valve assembly of a first embodiment of the present invention is generally shown in FIGS. 1-9a. The exterior of the valve housing 10 is shown in FIGS. 1 and 2. The housing 10 is comprised of an upper housing section 12 and a lower housing section 14. Housing 10 has an essentially hollow, cylindrical configuration. The spherical section 16 is rotatably mounted within housing 10. An annular flange 18 is formed about the circumference of the bottom of the upper housing section 12. A mating annular flange 20 is formed about the circumference of the top of the lower housing section 14. A plurality of mounting apertures 22 are spaced equidistant about the periphery of the upper section flange 18 and a corresponding number of apertures 24 are spaced about the periphery of the lower section flange 20. In the preferred embodiment the apertures 24 on the lower section flange 18 are threaded and the two sections 12 and 14 are mated together and held in place by a plurality of connecting screws 26 which are inserted through the apertures 22 in the upper section flange and threaded into the apertures 24 in the lower section flange to form the integral valve housing unit 10. The upper end or inlet opening 28 of the upper housing section 12, is adapted to be sealingly connected to the drain or waste opening of the waste holding tank (not shown) of an aircraft or similar waste or fluid system. The lower or outlet opening 30 of the lower housing section 14 is connected to the aircraft's outlet drain (not shown) for connection to a waste removal facility, such as a truck or a holding tank. The discussion of the subject invention will be done in the context of the valve housing being mounted in an upright vertical position. This assumes that fluid flow from the waste tank and through the valve occurs under the force of gravity. It is recognized that alternate orientation of the valve is possible depending upon the particular application.

In the preferred embodiment inlet opening 28 and outlet opening 30 are co-axial circular apertures of approximately equal diameter. Similarly, the interior passageway 32 through valve body 10 is of a diameter at least equal to or greater than the diameter of inlet opening 28 and outlet opening 30.

The valve is operated by means of an activation handle 34 which is rotatably mounted on the exterior of the lower housing section 14, as shown in FIG. 2. The handle as depicted in FIG. 2 is shown in the valve closed position. The handle 34 is shown in the valve open position by means of phantom lines 34a. Frequently, the valve housing 10 will be mounted within a confined space where access to handle 34 is limited. In those types of situations, a remote activation linkage system (not shown) is required, whereby the activation handle may be moved between open and closed positions from a location remote from the valve housing 10. The type of linkage utilized may be a mechanical rod/cable linkage assembly or a hydraulic linkage assembly or electro-mechanical linkage assembly. These and other linkage assemblies are known to those skilled in the art.

Figures 6, 7, 8, 8A:
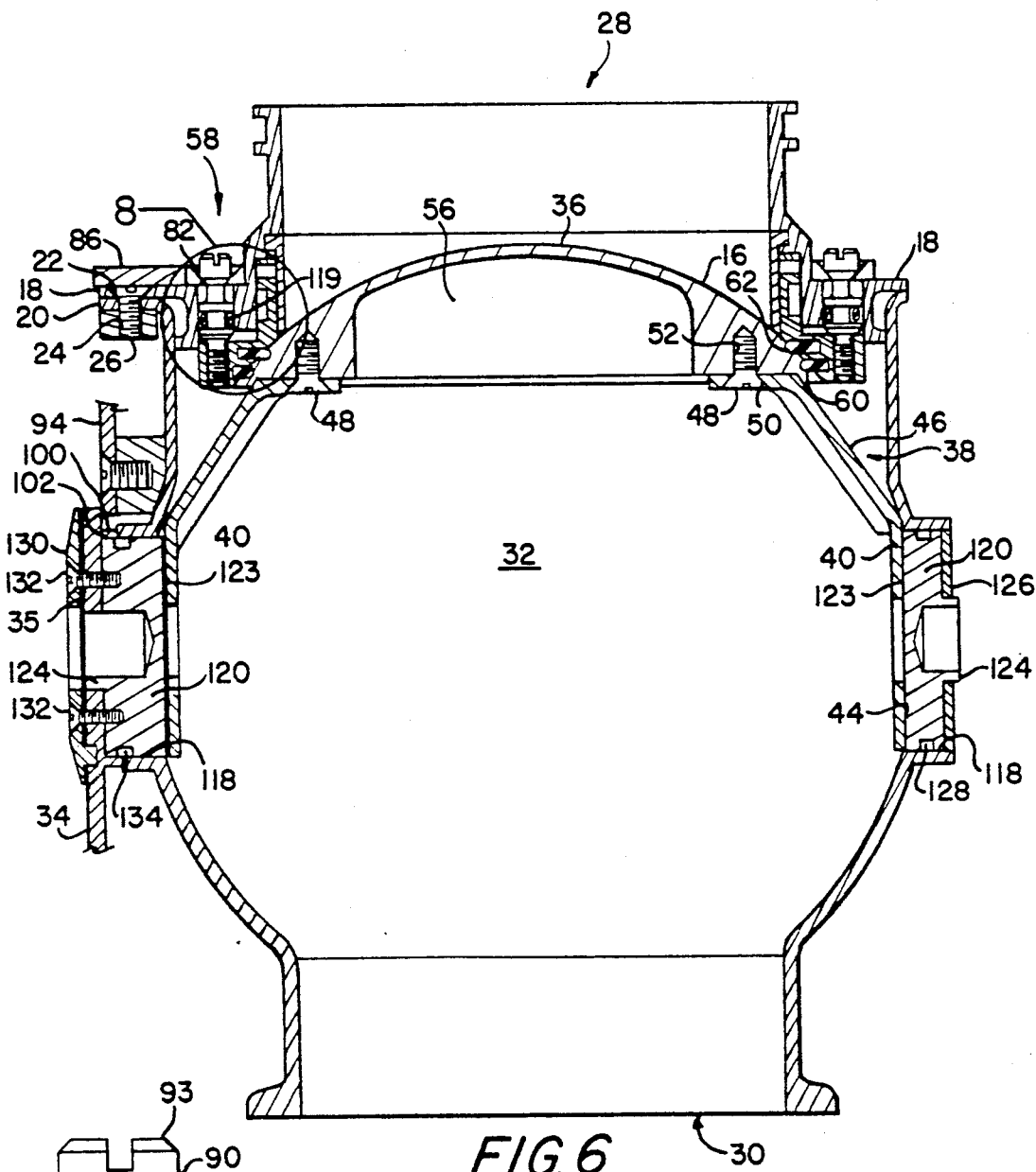
FIG. 6 is a cross-section side view of a first embodiment of the subject invention in the closed position.
FIG. 7 is a side view of the lifting screw of the first embodiment of the subject invention.
FIG. 8 is a partial cross-sectional side-view of the lifting and sealing mechanism of a first embodiment of the subject invention in the closed position.
FIG. 8a is a partial cross-sectional side-view of the lifting and sealing mechanism of a first embodiment of the subject invention in the open position.
Figure 9:
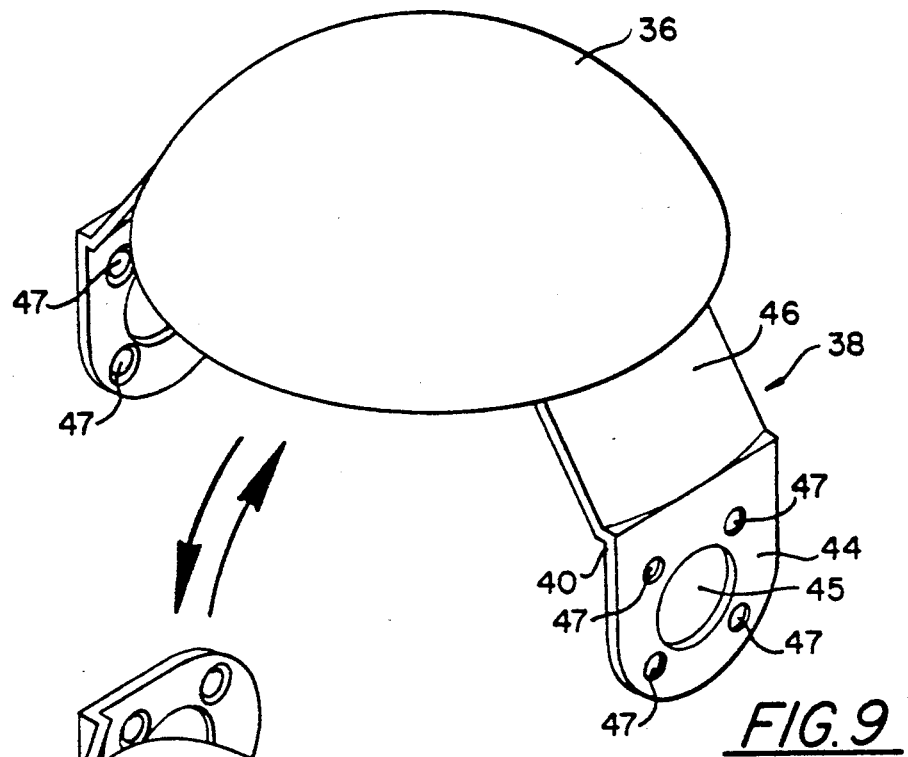
FIG. 9 is a perspective view of the valve sealing means of the subject invention in an upright or closed position.
Figure 9A:
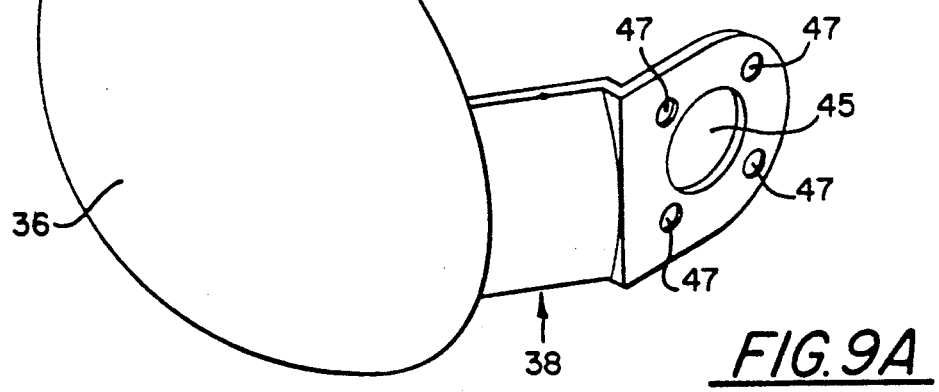
FIG. 9a is a perspective view of the valve sealing means of the subject invention in a horizontal or open position.

The spherical segment 16 utilized in the subject invention is shown in FIGS. 6, 9 and 9a. In the preferred embodiments, spherical segment 16 is comprised of a spherical segment top 36 mounted on rotating arm bracket assembly 38. Spherical segment 36 forms a curved cap which provides the same sealing action as a traditional ball valve but without the additonal weight or obstructive bulk inherent in a ball valve. The spherical segment assembly includes a pair of brackets 40 connected by means of screws as illustrated in FIG 6. The spherical segment 36 is mounted atop bracket 38 and fastened by means of screws 48 which are inserted through apertures 50 in bracket 40 and threaded into recesses 52 located in the bottom surface 54 of cap 36. A recessed cavity 56 is provided in cap 36.

The actual connection of the handle and rotation assembly to the valve means is illustrated in FIG. 6. Apertures 118 are provided on opposite sides of the housing of lower section 14. Rotation journal 120 is rotatably mounted within apertures 118. Journals 120 are essentially circular shaped, having a center within the cylindrical section 122 and a centrally aligned hub 124 extending perpendicularly from both exterior sides of the central cylinder 122. As shown in FIG. 6, the interior face 123 of each rotational journal 120 abuts and is rigidly connected to the vertical surface of bracket 40. Journal 120 is attached to the bracket by means of a plurality of screws (not shown) which are inserted through apertures 47 in vertical surface of bracket 40 and threaded into the body of rotational journal 120. On the side of the valve housing opposite the handle 34, a cover plate 126 is fastened over the exterior of journal 120. To prevent fluid leakage through aperture 118, an O-ring or elastomer seal 128 is provided. On the side upon which the handle 34 is located, as shown in FIG. 6, the handle includes a central opening 35 which allows the handle to be placed over hub 124 on rotational journal 120. A cover plate 130 is then inserted atop the handle and mounting screws 132 are utilized to connect the mounting plate 130 and handle 34 to the rotational journal 120. Again, to prevent fluid leakage through this aperture, an elastomer seal or O-ring 134 is provided. As shown, therefore, in FIG. 6, upon rotation of the handle, rotational journal 120 is rotated within the housing and by virtue of it being rigidly fastened to vertical surfaces of the bracket assembly 38, the spherical segment 16 is rotated between closed and open positions.

As shown in FIG. 6, when spherical segment 16 is in the closed position, the valve cap 36 extends into the interior of upper housing section 12 and is in engagement with the sealing and lifting assembly 58. The assembly 58 includes a pair of elastomer seals 60, 62 mounted within lifting ring 64. Lifting ring 64 is essentially a cylindrical sleeve having a flange extending radially outward from the bottom of the sleeve providing an L-shaped cross-section with the horizontal leg 65 and vertical leg 66 being joined by means of curved shoulder 67. Curved shoulder 67 has a radius of curvature compatible to that of the surface of cap 36. Elastomer seals 60 and 62 are mounted within channels 68, 69 formed in shoulder 67. As shown in FIG. 8a, in the relaxed, non-sealing position, seals 60 and 62 extend beyond channels 68 and 69.

Lifting ring 64 slidably fits within cylindrical recess 70 formed in the bottom section of inlet 28. Said lifting ring 64 is normally urged downward towards engagement with the cap 36 by means of wave spring or bias means 72 which is positioned with recess 70 between the top surface 74 of vertical leg 66 lifting ring 64 and shoulder 75 formed by the junction of recess 70 and inlet 28.

Since the aircraft toilet waste tank will hold, in addition to the waste fluid, solid waste material, it is necessary to provide a means for removing this solid waste material from the surface of the cap 36 and furthermore from preventing this solid waste material from coming into engagement with the seals or O-rings 60 and 62. This is accomplished by means of a fixed scraper tube 76. The scraper 76 is comprised of a hollow cylindrical tube mounted within the inlet 28 of the upper housing section 12. The interior diameter of the scraper tube 76 is essentially equal to the interior diameter of the inlet mouth 28 of the upper housing section 12, as shown in FIG. 6. The bottom edge 78 of scrapper 76 has a compatible configuration to the radius of curvature of the surface of the cap 36. An annular flange 80 extends radially outward about the top periphery of the scraper tube 76. This annular flange 80 is positioned within a circumferential recessed channel 81 in the interior wall 82 of the upper housing section 12. The engagement of annular flange 80 with channel 81 maintains the scrapper 76 in a fixed position within the interior of upper section 12. The exterior wall 77 of scraper tube 76 closes off one side of recess 70 to form channel 79 within which vertical leg 66 moves in a vertical direction. As shown in FIGS. 8 and 8a, vertical leg 66 of lifting ring 64 moves within channel 79. Wave spring 72 is positioned within this recessed channel 79, above the top surface 74 of the lifting ring 64. The wave spring 72 acts to exert a constant downward force on the lifting ring 64. Although a preferred embodiment would utilize a wave spring 54 to provide a downward biasing force on the scraper tube 76, it is to be understood that other types of springs or biasing means known to those skilled in the art may be used.

During rotation of the valve from the closed to the open position, the seals 60, 62 are first lifted upward away from sealing engagement with the cap 36.

Figure 3:
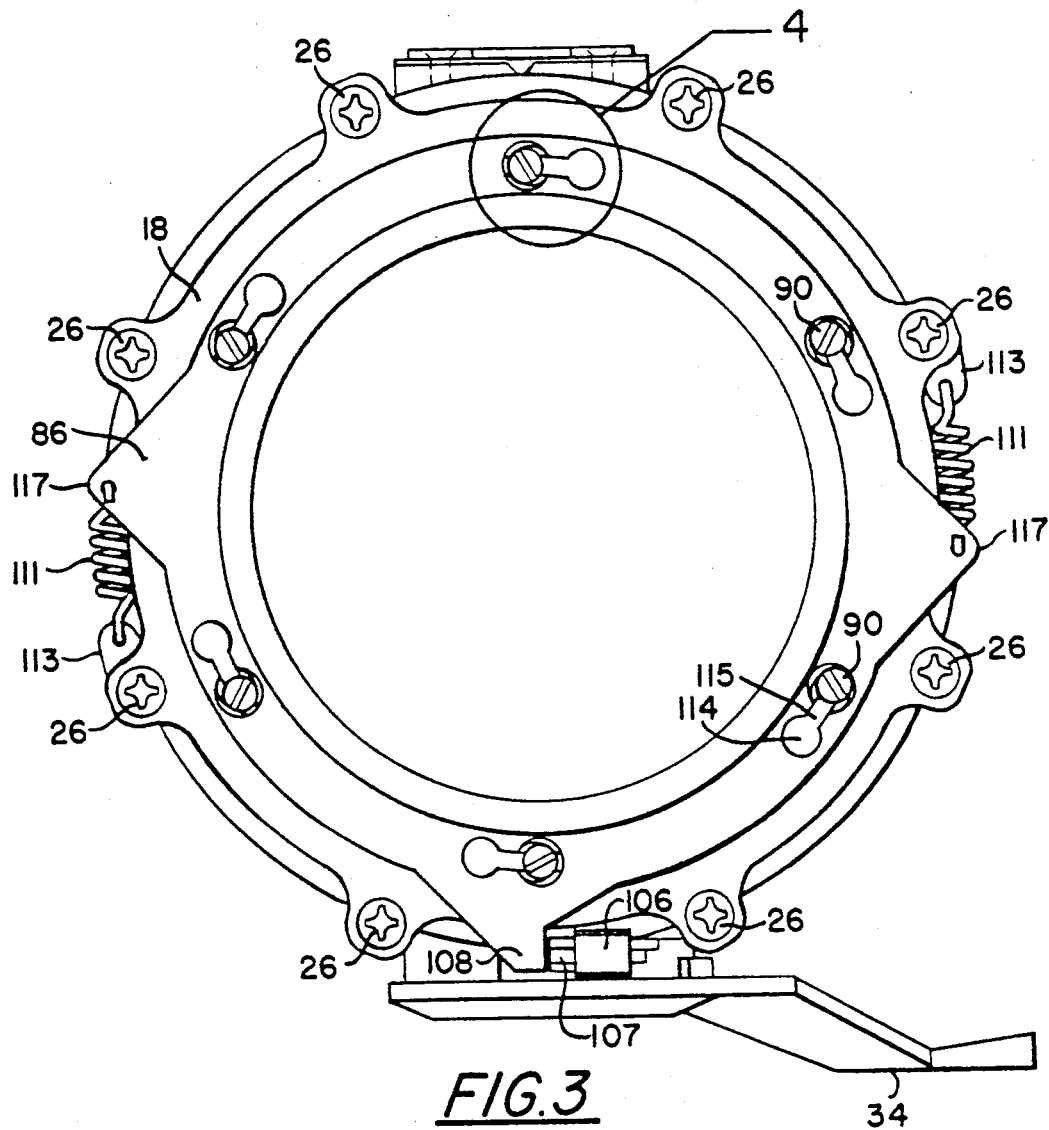
FIG. 3 is a top view of the first embodiment of the subject invention.

This is accomplished by means of lifting assembly 58. A plurality of apertures 82 are provided about the periphery of upper section flange 18. These apertures are positioned inside of the apertures 22 which accommodate the connecting screws 26. A corresponding plurality of aligned apertures 84 are provided in the horizontal leg 65 of lifting ring 64. As shown in FIGS. 1 and 3, a lifting collar 86 fits around upper housing section 12 and rests on the top of annular flange 18. A plurality of apertures 88 is formed around collar 86 corresponding to apertures 82 and 84 formed in flange 18 and horizontal leg 64, respectively. Lifting screw 90 is inserted through aligned apertures 82, 84 and 88 and threaded into apertures 84. As shown in FIG. 8, apertures 88 have sloped or chamfered sides 89 which correspond to corresponding sloped or chamfered shoulders 92 on the bottom of head 93 of screws 90. When collar 86 is rotated chamfered shoulder 89 engages shoulder 92 and raises screw 90 upward. Since screw 90 is engaged with lifting ring 64, the lifting ring is raised upward which separates the seals 60 and 62 from the cap 36. The seals are shown in this separated form in FIG. 8a.

The rotation of the lifting collar 86 is activated by means of pivot lever 94. Pivot lever 94 is mounted externally of lower section housing 14 above activation handle 34 and pivots about mounting screw 96. A cam follower 98 is formed at the lower end of pivot arm 94. In a preferred embodiment, cam follower 98 may actually be a roller 99 rotatably mounted about pin 101 at the lower end of pivot arm 94. A first recess 100 is formed in the sleeve 102 of handle 34 and when the valve is in the closed position cam follower 98 rests within first recess 100. Recess 100 is formed with a sloped front shoulder 104 which engages cam recess 100. When the handle 34 is rotated to move the valve from the closed to an open position the clockwise rotation (as shown in this example) of the handle urges shoulder 104 against cam follower 98 which causes the pivot lever to pivot about screw 96. As lever 94 pivots the upper end 106 of the lever 94 is moved to the left as viewed in FIG. 2. The upper end 106 of lever 94 is engaged with edge 108 which extends outward from the edge of lifting collar 86. As upper end 106 of lever 94 moves to the left it exerts a lateral movement to edge 108 and lifting collar 86 is moved or rotated to the left. In the preferred embodiment, adjustment pin 107 may be threadably mounted in the front face of upper end 106 so as to engage edge 108. Pin 107 may be adjusted to account for any slack in the handle linkage. By means of adjustment pin 107, the linkage may be set so that rotation of lifting collar 86 commences immediately upon rotation of activation handle 34. The rotation of the collar 86 causes shoulders 89 on apertures 88 to engage lifting screw shoulders 92 and lift the lifting screws 90. This in turn results in the lifting movement of the seals 60 and 62 away from engagement with the cap 36. Once the activation handle 34 has been rotated a slight amount cam follower 98 is forced from recess 100 and rides on surface 110 of the handle sleeve 102. This keeps the lifting assembly 58 in the lifting state. Continued rotation of handle 34 results in an opening of the valve without the seals being in contact with the cap 36. Once the valve has been rotated to the open position cam follower 98 rests within a second recess 112 formed in surface 110 and which acts to detent the handle in place. To close the valve, the handle 34 is rotated in the opposite direction (counterclockwise, as shown in this example). When the handle 34 is returned to the closed position cam follower 98 again engages recess 100 and pivot lever 94 is pivoted clockwise away from the edge 108 on collar 86. Springs 111 then exert a force on collar 86 causing it to rotate. One end of springs 111 is connected to a rigid spring flange 113 which is connected to housing section 14 by means of screws 26. The distal end of springs 111 are connected to extensions 117 extending outward from lifting collar 86. As shown in FIG. 3 in the preferred embodiment, a pair of springs 111 are provided on opposite sides of the valve housing 10. As collar 86 rotates to its original position wave spring 72 exerts a downward force on lifting ring 64 which causes seals 60, 62 to engage the surface of cap 36. When engaged with cap 36, seals 60 and 62 are deformed as shown in FIG. 8 to form a fluid tight seal.

Figure 4:
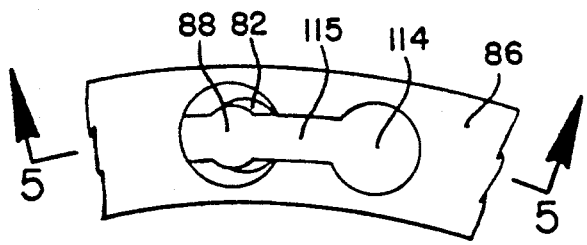
FIG. 4 is a partial detailed top view of the lifting assembly of a first embodiment of the subject invention.
Figure 5:
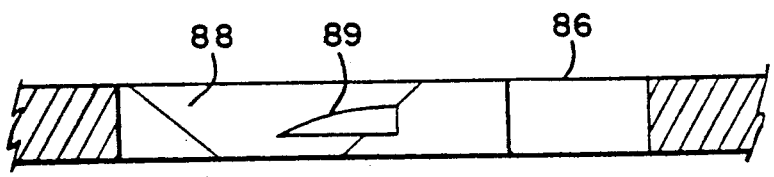
FIG. 5 is a cross-sectional side view of the lifting assembly taken along line 5—5 of FIG. 4.

As shown in FIG. 3 and in greater detail in FIG. 4, to assist in ease of assembly the apertures 88 in lifting collar 86 are formed in connection with mounting apertures 114 and connecting slot 115. Mounting apertures 114 are of a larger diameter than the head of screws 90. The collar 86 is inserted over the screws and then rotated counter-clockwise so that the shaft 116 of the screws 90 passes through connecting slot 115 until screws 90 are aligned with apertures 88. As shown in FIG. 8, the head 93 of screw 90 is larger than apertures 88, thus preventing the collar 86 from being lifted off of the annular flange 18 on upper housing section 12. Reverse rotation of the collar 86 such that mounting aperture 114 becomes aligned with screw is prevented by the engagement of the edge 108 with pivot lever 94 via adjustment pin 107.

In order to be able to monitor or test the state of the seals 60 and 62, a third recessed channel 71 is provided in the interior wall of lifting collar 64 between channels 68 and 69. Air passage way 73 connects channel 71 with one of the threaded apertures 88 located in horizontal leg 65. As shown in FIG. 8, a passage 75 is provided down the centerline of lifting screw 90 to an intermediate point where passage 75 extends at a right angle and connects with air passageway 73 when lifting screw 90 is properly threaded within aperture 88. Seal 62 can be tested by drawing a vacuum on passage 75. If seal 62 is damaged or worn, fluid from the waste tank will be drawn by seal 62. Similarly, seal 60 may be tested by applying pressure to passage 75. If seal 60 is damaged or worn, it will not hold the pressure applied. In order to prevent leakage out through the lifting mechanism, each of the lifting screws 90 are provided with a pair of spaced ribs 116a extending radially outward from screw shaft 116. An O-ring 119 or other type of elastomer seal is provided within the space between ribs 116a. This serves to seal the lifting assembly and prevents fluid flow out through aperture 88.

Figure 10:
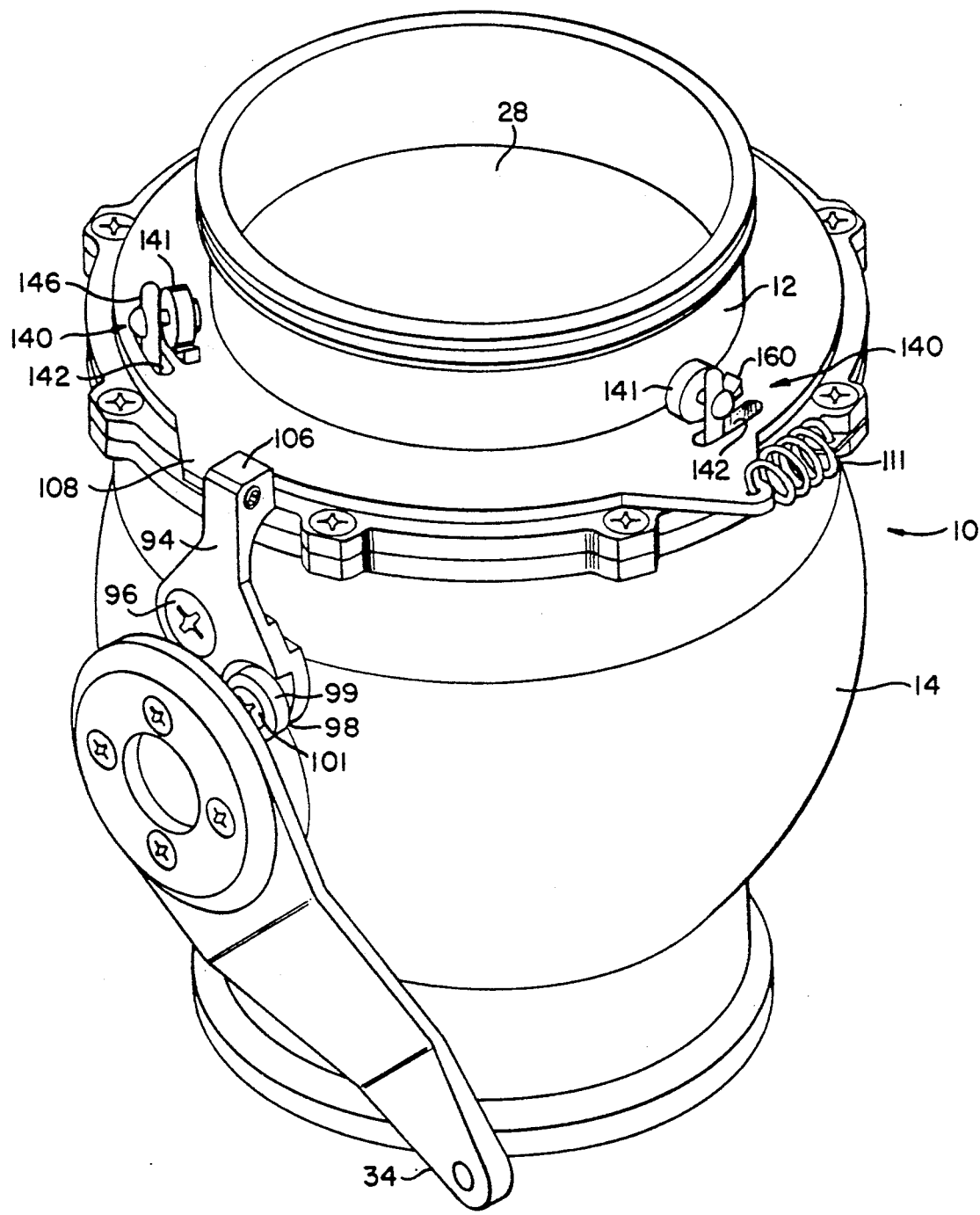
FIG. 10 is a perspective view of a second embodiment of the subject invention.
Figure 11:
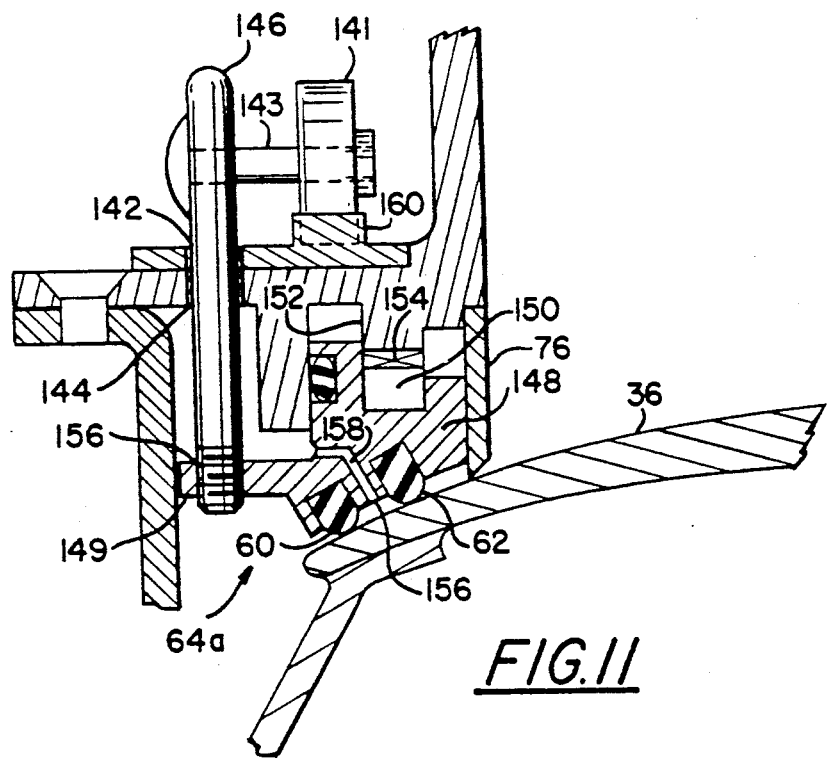
FIG. 11 is a partial cross-sectional side view of the lifting and sealing mechanism of the second embodiment of the subject invention.
Figure 12:
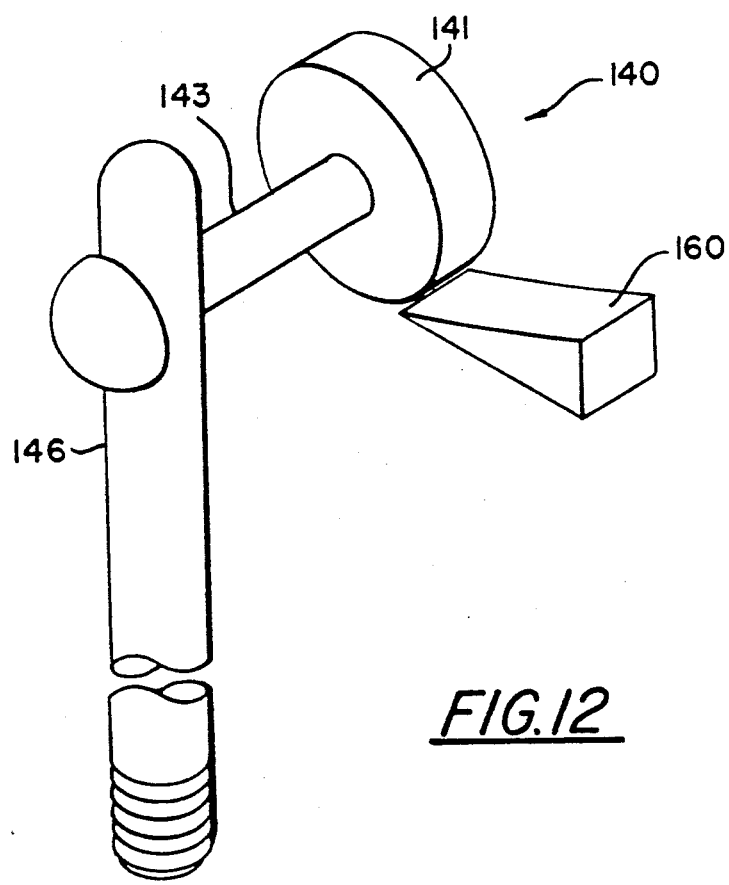
FIG. 12 is a perspective view of the components of the lifting mechanism of the second embodiment of the subject invention.

A second embodiment of the subject invention is shown in FIGS. 10, 11 and 12. In this embodiment, the valve and handle assemblies are the same as that discussed in the first embodiment, and the same reference numerals will be used to refer to parts common to the two embodiments, however, the lifting assembly has been modified as discussed below. In this second embodiment, the lifting screws 90 of the first embodiment have been replaced by lifting roller assembly 140. In this embodiment, a slot 142 is provided in lifting collar 86 and is aligned over and an aperture 144 provided in annular flange 18 of the upper housing section 12. A post 146 is inserted through slot 142 and aperture 144 and threaded into a slightly modified lifting collar 64a. Lifting collar 64a is essentially L-shaped having a vertical leg 148 and a horizontal leg 149. Post 146 is threaded into aperture 156 is horizontal leg 149. In this embodiment, the vertical leg 148 of lifting collar 64a includes a recessed channel 150 cut within its upper surface so that the cross-section of the upper or vertical leg 148 forms a U-shape, as shown in FIG. 11. The corresponding modification has been made to the interior of the interior wall of upper section 12 wherein a mating rib 152 extends downward from the bottom surface of interior section 12 and fits within recess 150. A biasing means, such as a wave spring 154, is placed within the recess 150.

As in the first embodiment described above, seals 60 and 62 are mounted within recessed channels 68 and 69. Said seals extend beyond the channels when the valve is not in the sealing position. A third recessed channel 156 is provided between channels 68 and 69. Air passageway 158 connects channel 156 with the exterior of lifting collar 64a. This allows for testing of the seals 60 and 62.

The application of a lifting force to the lifting ring 64a is applied by means of a cam and roller combination. Roller 141 is mounted on an axle 143 extending perpendicular from the upper portion of post 146. A cammed surface 160 is formed in the upper surface of lifting collar 86 as shown in FIGS. 10 and 12. In this embodiment, when the handle 34 is rotated, pivot lever 94 again exerts a lateral force against edge 108 causing the lifting collar 86 to be rotated to the left, as shown in FIG. 2. As the lifting collar 86 rotates, cam 160 is brought into contact with roller 141 and as the lifting collar 86 continues its lateral movement, said roller 141 moves or rolls upward along the cam surface 160, exerting a lifting force on the post 146, which in turn lifts upward on lifting collar 64a, thereby removing the seals 60 and 62 from contact with the surface 36 of the valve 16. As in the first embodiment, scraper tube 76 is provided which is fixedly mounted within the interior of upper section 12 and remains in contact with the surface of the spherical segment as it is rotated from the open to closed position and closed to open position so as to scrape any solid material off of the spherical segment and also prevent it from contact with the seals.

Figure 13:
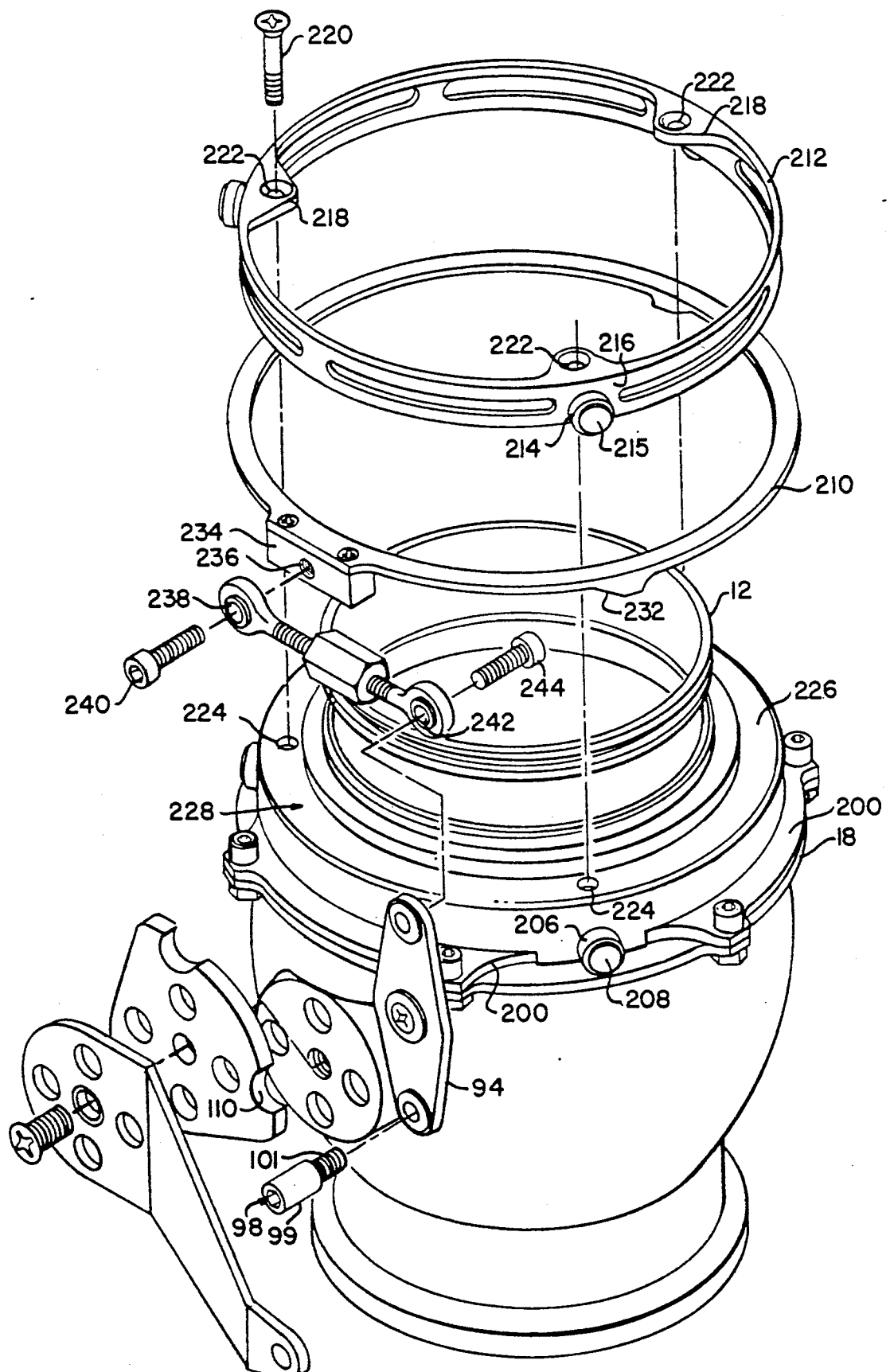
FIG. 13 is an exploded perspective view of a third embodiment of the subject invention.
Figure 14:
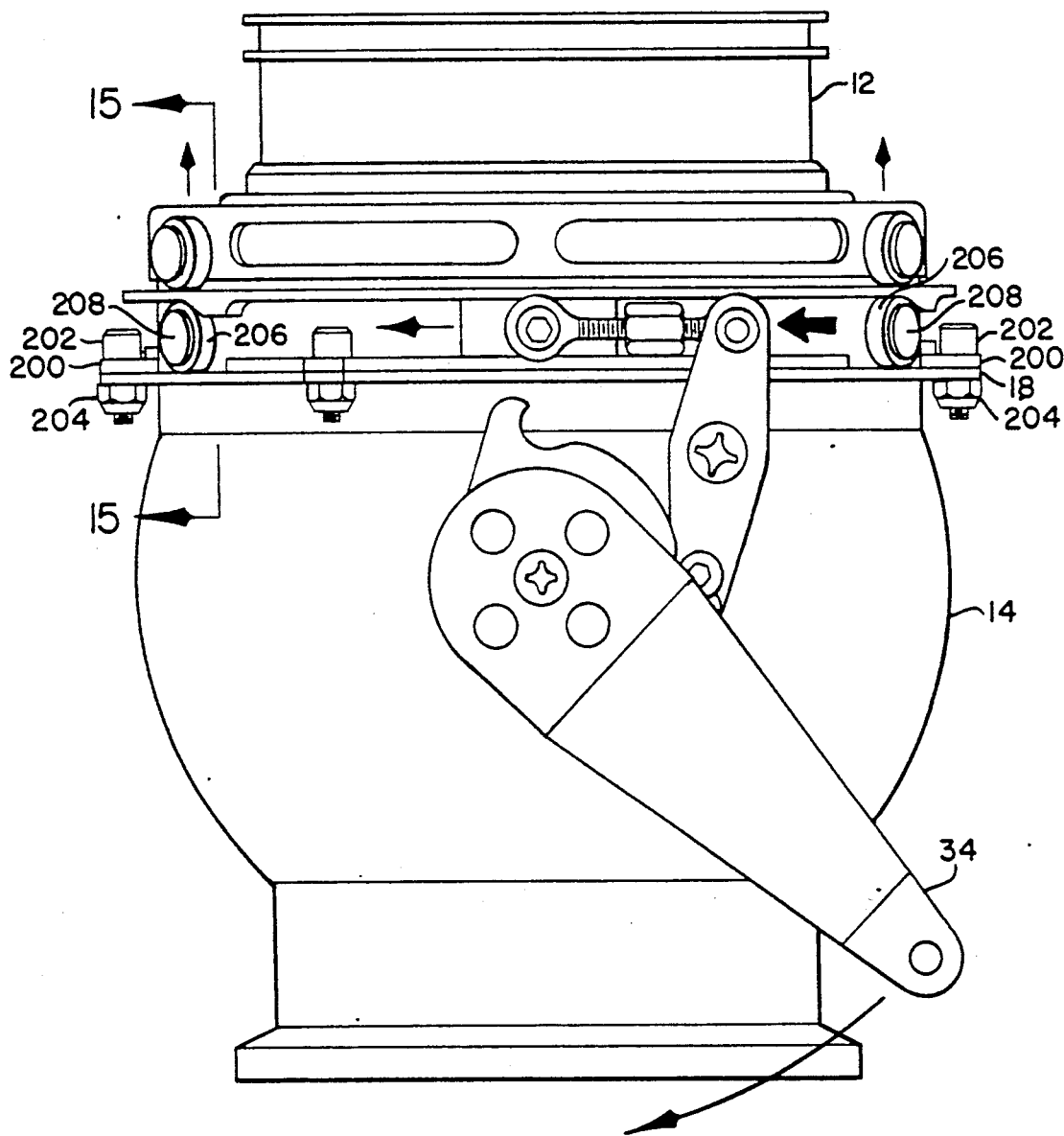
FIG. 14 is a side view of the third embodiment of the subject invention.

A preferred third embodiment of the lifting mechanism of the subject invention is shown in FIGS. 13-17a. Again, in describing this embodiment, the reference numerals for components matching the other two embodiments will be utilized. In this embodiment, the upper housing section 12 is connected to lower housing section 14 by means of a plurality of annular flanges 200 spaced equidistant about the periphery of upper housing section 12 such that when upper housing section 12 is seated atop lower housing section 14, said plurality of flanges rest on annular mating flange 18 of upper housing section 14. As shown in FIG. 13, flanges 200 and 18 are joined together by means of standard fasteners, such as nut 202 and bolt 204 combinations. Other fastening means known to those skilled in the art may be utilized. Rather than the continuous flange provided in the first and second embodiments, in the preferred embodiment the mating flanges 200 are spaced equally about the periphery with a space between said flanges. A roller 206 is rotatably mounted on a mounting peg 208 extending perpendicular from the side wall of the upper housing section 12 in the space between adjoining mating flange segments 200. In order to facilitate frictionless rotation of the roller 206 about the mounting peg 208, standard bearing means (not shown) may be provided. In the preferred embodiment three roller assemblies 206 are provided. A bearing ring 210 is inserted over the top of upper housing section 12 and rests upon rollers 206. A lifting collar 212 is in turn inserted over upper housing section 12 and placed atop bearing ring 210. A plurality of bearing rollers 214 mounted on mounting posts 215, corresponding to bearing roller 206 mounted on the exterior of lower housing section 14, are mounted on and extend perpendicular from the side wall 214 of lifting ring 212. A corresponding plurality of mounting flanges 218 extend inwardly within the lifting collar 212, adjacent the roller bearing units 214. Lifting screws 220 are inserted through the apertures 224 provided in mounting flanges 218 and pass through apertures 224 in the interior upper surface 226 of shoulder 228 formed in upper housing section 12. Lifting screws 220 are inserted into lifting collar 212 and threaded into lifting ring 230 positioned within the valve housing. In the preferred embodiment, the head of lifting screws 220 are countersunk into mounting flanges 218. A downwardly facing ramp 232 is integrally formed with the underside of bearing ring 210. The valve is assembled such that when the valve member 16 is in the closed or sealing engagement position, the ramp 232 is positioned adjacent the lower roller assembly 206. When fully assembled, bearing ring 210 is rotatably mounted between rollers 206 and 214.

A connecting block 234 is bolted to the underside of bearing ring 210 at a position above the external handle 34 of the device. A threaded aperture 236 is provided in the front face of fastening block 234 and one end of a turnbuckle eye 238 is connected to block 234 by means of screw 240. The opposing turnbuckle eye 242 connector is connected to the upper end 106 of pivot arm 94 by screw 244. When handle 34 is rotated in a clockwise direction, cam or roller 98 is forced out of recess 110 and the lower end of pivot arm is rotated to the right. The resultant leftward motion of upper arm of the upper end of pivot arm 94 causes the turnbuckle asembly to move in a lateral direction leftward, thereby moving the connecting block 234 in that direction. This results in the roller ring 210 being rotated to the left such that ramp 232 is forced between rollers 206 and 214. As the ramp 232 passes between the roller assemblies, lifting collar 212 is raised upward on the plurality of ramps 232 which in turn exerts an upward or lifting force on lifting screws 220 extending through the mounting flanges 218 on lifting collar 212 and connecting with the lifting ring 230 inside of upper housing section 12.

Figure 15:
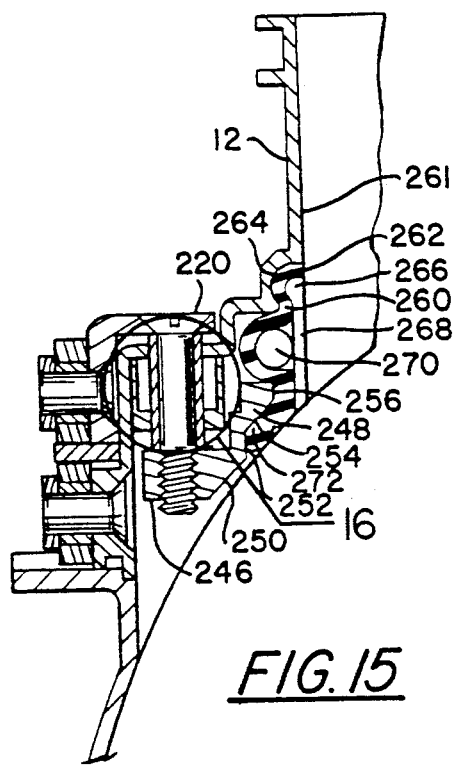
FIG. 15 is a cross-sectional side view of the subject invention in the sealing position taken along Line 15—15 of FIG. 14.
Figure 15A:
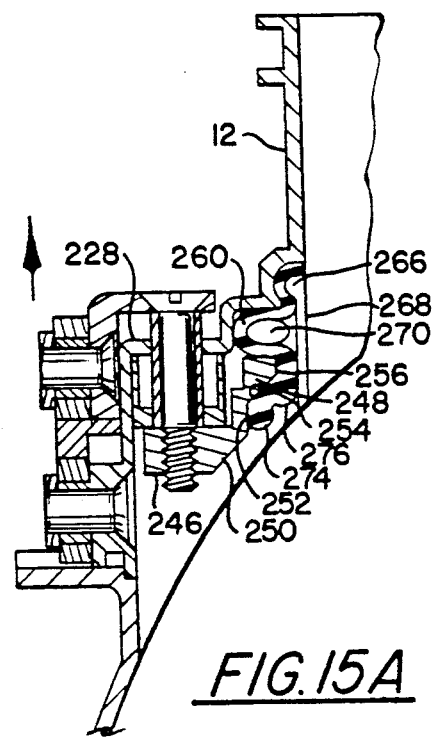
FIG. 15a is a cross-sectional side view of the subject invention in an open position taken along Line 15—15 of FIG. 14.

As shown in FIGS. 15 and 15a, lifting ring 230 includes a horizontal leg 246, through which lifting screw 220 is threaded, and a vertical leg 248. The junction of vertical leg 248 and horizontal leg 246 is comprised of a curved section 250 having a compatible surface approximately equal to that of the curved surface 36 of the valve. The interior surface of vertical leg 248, which faces the interior of the housing and valve 16, is comprised of a first vertical section 252 connected to a inwardly, upwardly sloping compression shoulder 254 and a second vertical section 256. In this embodiment, the sealing force is provided by means of an elastomer sealing sleeve 260, which is positioned within the interior of upper section 12. The upper end 262 of elastomer collar 260 is pressed within a curved recess 264 formed in the side wall 261 of upper section 12 and is held in place by an outwardly projecting annular rib 266 located at the upper end of scraper tube 268. Elastomer sleeve 260 is folded around compression spring 270, which is formed in a ring encircling the exterior of the scraper tube. The elastomer collar continues around spring 270 and is held between the exterior wall of scraper tube 268 and the second vertical segment 256 of lifting collar 230. The sealing end 272 of the elastomer sealing collar is then formed to engage shoulder 254 and first vertical section 252 as shown in FIG. 15a. Annular ribs 274 and 276 extend around the base or sealing end 272 of elastomer sleeve 260. The ribs 274, 276 serve to function as two separate elastomer seals or O-rings when engaged with the surface of the valve means. As shown in FIG. 15, coil compression spring 270 is of a sufficient diameter to deform elastomer sleeve 260 inwardly such that the body of the elastomer sleeve 260 atop the upper face 279 of vertical leg 248 the lifting collar 230. In this configuration, the spring 270 in its relaxed form exerts a downward force on the lifting ring 230, which results in annular ribs 274 and 276 coming into sealing engagement with valve surface 36. When the valve handle has been rotated and the lifting ring 212 moved to an upward position as previously described, lifting screw 220 raises lifting ring 230 upward and coil spring 270 is deformed into an elliptical configuration as shown. At this point, annular ribs 274 and 276 are drawn away from the surface 36 of the valve means so that it may be rotated without engaging the elastomer seals. As in the other two embodiments previously described, scraper tube 268 remains in a fixed position so as to scrape any solid materials off of the surface 36 of the valve means 16 as well as prevent any solid materials from coming into contact with the seals.

Figure 16:
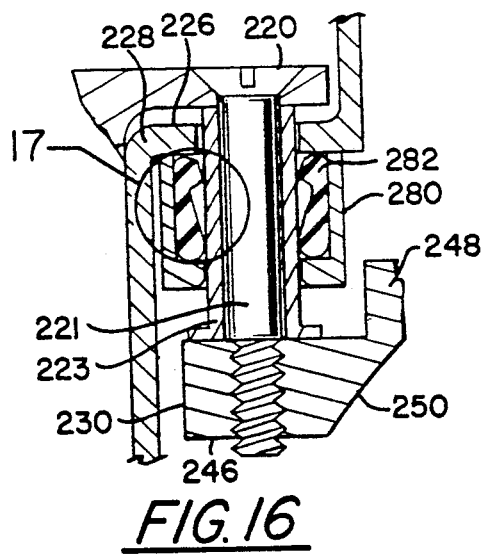
FIG. 16 is a detail cross-sectional view of the exterior sealing means of the third embodiment of the subject invention.
Figures 17, 17A:
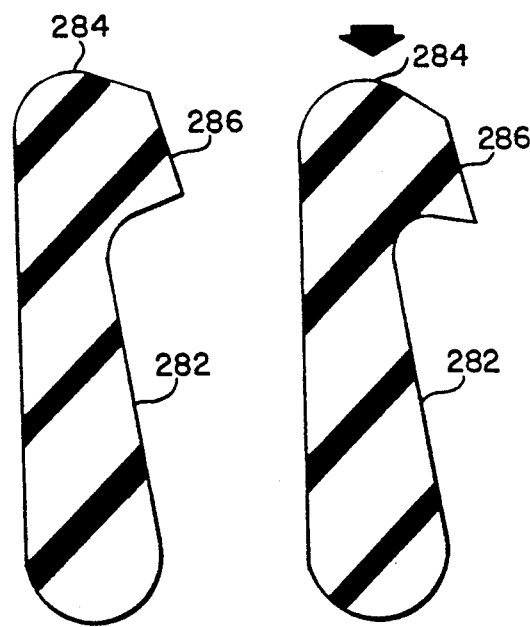
FIG. 17 is a cross-sectional side view of the elastomer seal shown in FIG. 16.
FIG. 17a is a cross-sectional side view of the elastomer seal shown in FIG. 17 in a sealing configuration.

In order to prevent fluid flow outward from the valve housing through the lifting screw apertures, a hollow sealing housing cylinder 280 is provided about the shaft 221 lifting screw 220. In a preferred embodiment, shaft 221 is actually positioned within guide tube 223 as shown in FIG. 16. The interior of the housing 280 is sealed by means of an elastomer seal 282 as shown in detail in FIGS. 16, 17 and 17a. Seal 282 prevents fluid flow through aperture 224 located in the upper surface 226 of shoulder 228 of upper section 12. Seal 282 is shown in its underformed state in FIG. 17. When inserted with housing 280, the top 284 of seal 282 is depressed downward which forces angled sealing face 286 into sealing engagement with the internal side walls of housing 280.

Although specific embodiments of the invention have been described and illustrated it is clear that the invention is susceptible to numerous modifications and embodiments within the ability of those skilled in the art, without the exercise of the inventive faculty. Thus, it should be understood that various changes in form, detail and application of the present invention may be made without departing from the spirit and scope of the invention.

We claim:

1. An improved valve assembly comprising:
    a valve housing having inlet and outlet openings, said housing including a fluid passageway extending through said housing and connecting said openings;
    a valve means for closing and opening the fluid passageway rotatably mounted within said valve housing;
    a sealing means for preventing fluid flow past said valve means mounted within said valve housing, said sealing means moveable from a first position in a sealing engagement with said valve means and a second position of non-engagement with said valve means;
    a rotatable lifting means mounted about said valve housing for moving said sealing means between said first and second positions; and
    a handle means for operating said lifting means and for rotating said valve means.

2. The improved valve assembly of claim 1 further including a protection means for preventing solid materials passing through said fluid passageway from coming into contact with said sealing means.

3. The improved valve assembly of claim 2 wherein the valve means includes a spherical segment which remains in contact with said protection means during rotation from a closed to an open position.

4. The improved valve assembly of claim 1 wherein the sealing means comprises at least one elastomer seal mounted within a movable ring, said ring being co-axial with and movable along the axis of said fluid passageway.

5. The improved valve assembly of claim 4 further comprising a biasing means for urging the sealing means into engagement with said valve means.

6. The improved valve assembly of claim 4 wherein the lifting means comprises a circular collar mounted about and co-axial with said valve housing, said collar being rotatably perpendicular to the axis of movement of said ring; and connection means for connecting said circular collar to said ring and imparting axial movement to said ring in response to rotational movement of said collar.

7. The improved valve assembly of claim 1 wherein the handle means is comprised of a first lever mounted externally of said valve housing and connected to said valve means and further comprising a pivot lever having opposed ends, one end of said pivot lever being in contact with said circular collar and the distal end of said pivot lever being in engagement with said first lever, whereby rotation of said first lever imparts movement to said collar through said pivot lever and also rotational movement to said valve means.

8. The improved valve assembly of claim 2, wherein said protection means comprises a hollow cylindrical tube fixedly mounted within said fluid passageway.

9. An improved valve assembly comprising:
a valve housing having an inlet opening and outlet opening and a fluid passageway connecting said inlet and outlet openings;
a valve rotatably mounted within said fluid passageway, rotatable between a first position closing said fluid passageway and a second position opening said fluid passageway;
at least one sealing member mounted in a moveable seal support member within said valve housing, said sealing member being in contact with said valve when said valve is in a first position;
a lifting collar rotatably mounted about said valve housing;
a connecting member connecting said moveable seal support member and said lifting collar; and
a rotatable handle connected to said valve and to said lifting collar wherein rotation of said handle from the closed to open position rotates the valve from a closed to open position and moves said seal support member away from said valve.

10. The improved valve assembly of claim 9 further comprising a biasing means for urging the sealing member into engagement with the valve.

11. The improved valve assembly of claim 9 wherein said lifting collar includes a plurality of apertures, said apertures having a sloped shoulder and a corresponding plurality of apertures are provided in the valve housing; and, wherein said connecting members are comprised of a pin, one end of said pin being inserted through said lifting collar and valve housing apertures and connected to said seal support member, the remaining end of said pin being positioned within said apertures and aligned with said sloped shoulder; wherein rotational movement of said lifting collar results in axial movement of said seal support member.

12. The improved valve assembly of claim 9 further comprising a scraper member, said scraper member being mounted so as to remain in contact with said valve during rotation between open and closed positions.

13. An improved valve assembly comprising:
a valve housing having an inlet opening and outlet opening and a fluid passageway connecting said inlet and outlet openings;
a valve rotatably mounted within said fluid passageway, rotatable between a first position closing said fluid passageway and a second position opening said fluid passageway;
at least one sealing member mounted in a moveable seal support member within said valve housing;
a lifting collar rotatably mounted about said valve housing;
a connecting roller assembly connecting said moveable seal support member and said lifting collar; and
a rotatable handle connected to said valve and to said lifting collar wherein rotation of said handle from the closed to open position rotates the valve from a closed to open position and moves said seal support member away from said valve.

14. The improved valve assembly of claim 13 wherein a plurality of slots are provided within said lifting collar and a corresponding plurality of apertures are provided in said valve housing;
a corresponding plurality of cam surfaces provided on said lifting collar adjacent said slots; and
further wherein the connecting roller members are comprised of a pin insert through said slots and apertures and connected at one end to said ring, a roller being mounted at the remaining end of said pin adjacent to and aligned with said cam surface, whereby rotational movement of said lifting collar causes said roller member to advance along said cam surface and said ring to move axially away from said valve.

15. The improved valve assembly of claim 13 further comprising a spring for urging the sealing member into engagement with the valve when said valve is in a first position.

16. The improved valve assembly of claim 13 further comprising a scraper member mounted between said inlet opening and said sealing means.

17. An improved valve assembly comprising:
a valve housing having an inlet opening and outlet opening and a fluid passageway connecting said inlet and outlet openings;
a valve rotatably mounted within said fluid passageway, rotatable between a first position closing said fluid passageway and a second position opening said fluid passageway;
at least one sealing member mounted in a moveable seal support member within said valve housing;
a lifting collar movably mounted about said valve housing, said lifting collar being connected to said seal support member;

a roller bearing ring assembly contacting said lifting collar; and a rotatable handle connected to said valve and to said roller bearing ring assembly wherein rotation of said handle from the closed to open position rotates the valve from a closed to open position and moves said seal support member away from said valve.

18. The improved valve assembly of claim 17 wherein the roller bearing ring assembly comprises:

a plurality of first bearing rollers mounted around the exterior sidewall of the valve housing;

a rotatable bearing ring mounted atop said plurality of said first bearing rollers, said ring including a plurality of cam surfaces form thereon adjacent said first bearing rollers; and a plurality of second bearing rollers mounted around the exterior sidewall of said lifting collar wherein said roller bearing ring is positioned between said plurality of first and second bearing rollers.

19. The improved valve assembly of claim 18 wherein rotation of the handle causes said rotatable bearing ring to rotate in such a manner that said cam surfaces engage said first bearing rollers causing said ring to move in a direction perpendicular to the direction of rotation and further causing said lifting collar to move in a direction perpendicular to the direction of rotation.

20. The improved valve assembly of claim 19 further comprising a scraper member positioned between the inlet opening and the sealing means.

* * * * *